(12) United States Patent
Kelly

(10) Patent No.: US 10,073,470 B1
(45) Date of Patent: Sep. 11, 2018

(54) HIGH SPEED, BROAD RANGE ELECTRO PNEUMATIC FLOW CONTROL VALVE

(71) Applicant: Edmund F. Kelly, Costa Mesa, CA (US)

(72) Inventor: Edmund F. Kelly, Costa Mesa, CA (US)

( * ) Notice: Subject to any disclaimer, the term of this patent is extended or adjusted under 35 U.S.C. 154(b) by 0 days.

(21) Appl. No.: 14/638,896

(22) Filed: Mar. 4, 2015

(51) Int. Cl.
*F16K 39/00* (2006.01)
*G05D 7/06* (2006.01)

(52) U.S. Cl.
CPC ............................... *G05D 7/0652* (2013.01)

(58) Field of Classification Search
CPC ..... Y10T 137/86919; Y10T 137/86928; B60T 15/027; F15B 2211/7053; F16K 31/0603; F16K 31/0679; G05D 7/0652
USPC ............. 137/487.5, 601.01, 625.11, 625.12, 137/625.13, 627.5, 628, 630.16, 599.07, 137/601.14
See application file for complete search history.

(56) References Cited

U.S. PATENT DOCUMENTS

| | | | | |
|---|---|---|---|---|
| 2,587,356 | A * | 2/1952 | McPherson | F16K 31/0679 137/613 |
| 3,050,255 | A * | 8/1962 | Branson | F16K 31/06 137/607 |
| 3,977,734 | A * | 8/1976 | Ronnhult | B60T 8/3605 137/627.5 |
| 4,620,567 | A * | 11/1986 | Kurtz | B60T 15/027 137/627.5 |
| 4,630,632 | A * | 12/1986 | Johnson | G05D 16/2093 137/596.18 |
| 4,796,661 | A * | 1/1989 | Hishinuma | G05D 16/2093 137/487.5 |
| 5,199,456 | A * | 4/1993 | Love | F23N 1/005 137/269 |
| 5,289,811 | A * | 3/1994 | Covert | F02M 25/0836 123/520 |
| 5,443,093 | A * | 8/1995 | Stoll | F15B 13/00 137/596.17 |
| 6,095,489 | A * | 8/2000 | Kaneko | H01F 7/06 251/129.15 |
| 6,305,401 | B1 * | 10/2001 | Uehara | G05D 16/2093 137/102 |
| 6,672,326 | B2 * | 1/2004 | Pappalardo | F23N 1/005 137/614.11 |
| 6,779,541 | B2 * | 8/2004 | Inayama | G05D 16/2093 137/102 |
| 9,249,895 | B2 * | 2/2016 | Hettinger | F16K 27/003 |
| 2001/0039969 | A1 * | 11/2001 | Needham | F16K 27/041 137/628 |

* cited by examiner

*Primary Examiner* — Reinaldo Sanchez-Medina
(74) *Attorney, Agent, or Firm* — Jeffer Mangels Butler & Mitchell LLP; Brennan C. Swain, Esq.

(57) ABSTRACT

An electropneumatic proportional flow valve improves flow control because it incorporates a plurality of internal valves in parallel with each electronically controlled, miniature proportional valve manipulated sequentially to each other. Such parallel arranged valves operated sequentially allows for precision control of the low-end of the full scale output; the larger mechanical valve allows for the high-end of the full scale output.

5 Claims, 1 Drawing Sheet

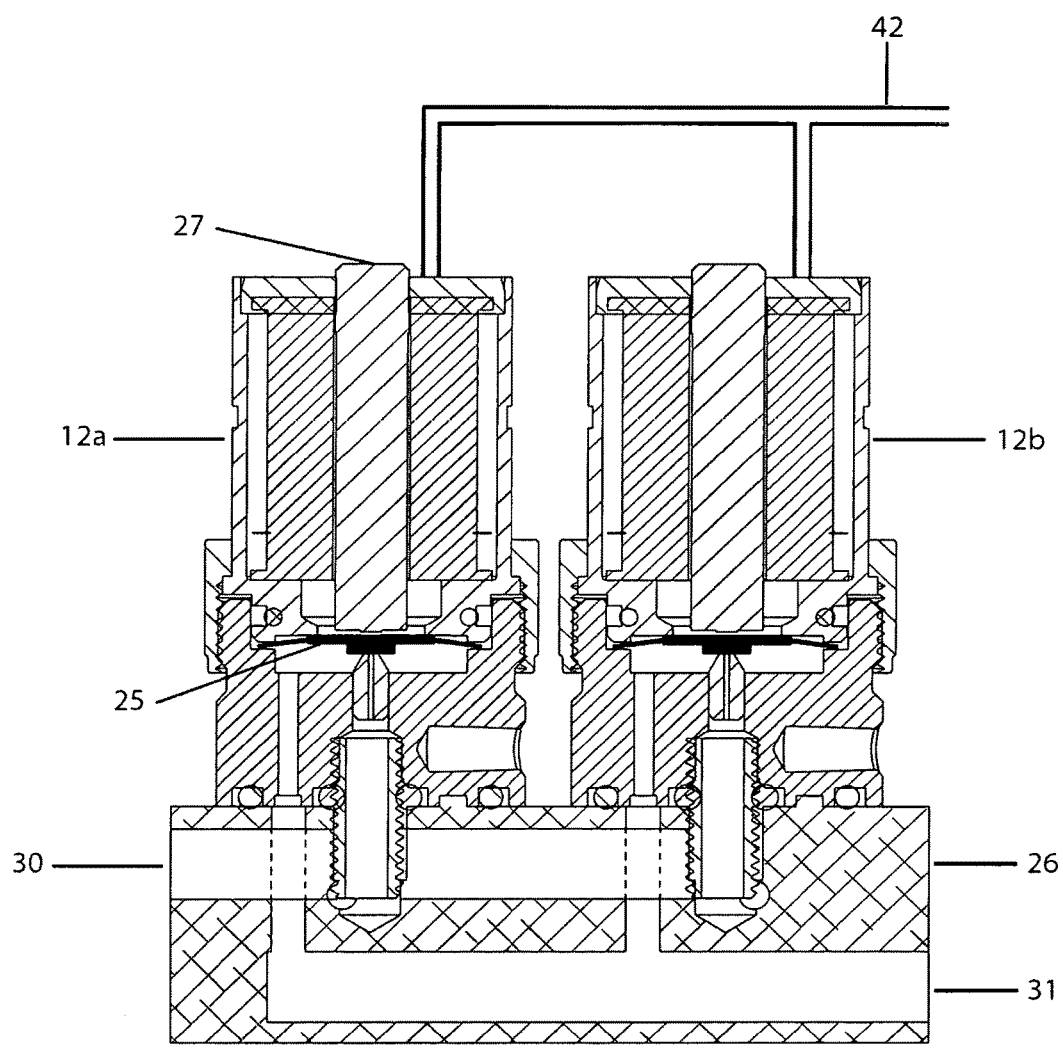

HIGH SPEED, BROAD RANGE ELECTRO PNEUMATIC FLOW CONTROL VALVE

BACKGROUND OF THE INVENTION

1. Technical Field of the Invention

The present invention relates generally to a device for electro pneumatic control of valves and, more specifically to a unique control device having a plurality of proportional control valves activating sequentially and operating in parallel.

2. Description of the Background Art

Numerous types of proportional pneumatic flow control valves are presently available which accurately control flow over a wide range of flow control applications. These single valves are typically calibrated to a specific range of flow rates; the accuracy of these valves is dependent upon the total range of capable flow, which is otherwise known as the "Full Scale" of the valve. A problem is that these units generally do not offer precision flow at lower rates: the valve percentage of error for the full scale of the valve may be too great; and, the low flow imprecision can be too problematic to the application.

A search of the prior art did not disclose any patents that read directly on the claims of the instant invention; however, the following references were considered related.

U.S. Pat. No. 5,462,253 to Asthana et al. discloses a dual slop flow control valve which operates by incorporating an electronically controlled valve actuator. The actuator subsequently controls a valve assembly; this process is accomplished using two mechanical valves in sequence.

U.S. Pat. No. 4,796,661 to Hishinuma et al. discloses a proportional electro-hydraulic pressure control valve that incorporates a pressure sensor in its valve body and the hydraulic fluid pressure in a pressure detecting fluid path provided in the valve body is delivered as an electric signal output by the pressure sensor. The pressure detecting fluid path is connected to a hydraulic fluid inlet port directly or through a restrictor or alternately the fluid path is connected to a pressure detecting port separated from both of the hydraulic fluid inlet port and a hydraulic fluid outlet port. The electric signal output from the pressure sensor is utilized to provide a numerical display of the controlled pressure or to effect the feedback control of a solenoid drive current through a closed loop.

U.S. Pat. No. 4,901,758 to Cook et al. discloses an electropneumatic transducer which operates quickly and accurately over a broad range of pressures to control high pressure, high flow devices at their point of operation. The transducer is lightweight and insensitive to position or vibration, and can be readily mounted to the device to be controlled at its workpoint and operated remotely by a process controller or other electrical device. There is also provided both internal and external feedback whereby the repeated accurate operation of the transducer is assured.

U.S. Pat. No. 4,241,750 to Furuse et al. discloses a pressure setting device in which a positive or negative pneumatic pressure source is coupled with a controlled system through a first electromagnetic valve and the controlled system is coupled with a negative or positive pneumatic pressure source through a second electromagnetic valve or opened therethrough to the air, and which is adapted so that the first and second electromagnetic valves are controlled to open or close to thereby set an air pressure in the controlled system, a deviation between the pressure of the controlled system and the set pressure is detected and the detected deviation signal is converted by a pulse converter into a pulse of the duty ratio or frequency corresponding to the deviation, by which pulse the first and second electromagnetic valves are controlled to open or close.

Of considerable relevance is U.S. Pat. No. 7,748,683 for an electronically controlled proportional valve and under common inventorship and common ownership, which is incorporated by reference herein as if fully rewritten. While a common aapproach is used to the extend that two independent valves in sequence are provided to increase accuracy over particular segments of the full flow range, other elements are different enough as to make the combination distinguished over the inventors' own co-pending art.

Consequently, a need has been felt for providing an apparatus and method of precision flow output over a very wide range of flows, from very low to very high, all with a common valve mechanism.

SUMMARY OF THE INVENTION

It is an object of the present invention to provide a mechanism and method which incorporates valves operating in a sequential mode for controlling a broad range of fluid flow rates.

It is another object of the present invention to establishes a unique electro pneumatic proportional flow control device and method that allows for improved valve actuation response time and an improved turn down ratio in regards to the electromagnetic response of the device to a supplied control voltage.

It is a feature of the present invention to achieve these objects by using a plurality of proportional valves activating sequentially such that the cumulative effect of said valves actuation offers high-speed and high-precision flow output characteristics at both low and high flow. The method of sequential, cumulative, multiple-valve control and resultant high-speed performance are achieved via calibrating the individual valves such that said valves are activated in sequential order, being predefined and dependent upon the activating voltage.

BRIEF DESCRIPTION OF THE DRAWINGS

Advantages and features of the present invention are better understood with reference to the following and more detailed description and claims taken in conjunction with accompanying drawings, in which like elements are identified with like symbols:

FIG. 1 is a schematic block representation of a high speed broad range electro pneumatic flow control valve according to the preferred embodiment of the present invention in which a plurality of proportional control valves activate sequentially and operate in parallel; and FIG. 1 is a fragmentary, side-elevational view of an electro pneumatic valve according to the present invention.

DESCRIPTION OF THE PREFERRED EMBODIMENTS

The best mode for carrying out the invention is presented in terms of its preferred embodiment, herein depicted within the Figures.

1. Detailed Description of the Figures

As shown in conjunction with FIG. 1, the present invention establishes a unique electro pneumatic proportional flow control device 10 and method that allows for improved valve actuation response time and an improved turn down ratio in regards to the electromagnetic response of the device to a supplied control voltage. This is achieved using variable plurality of proportional valves (shown herein as 12a, 12b and 12c but anticipated as being through 12n) activating sequentially such that the cumulative effect of said valves actuation offers high-speed characteristics. Further, as will be obvious to one skilled in the relevant are and in light of the current teachings it would be further seen that due to the use of multiple high-precision proportional valves, high-precision flow output characteristics can be obtained at both low and high flow.

The method of sequential, cumulative, multiple-valve control and resultant high-speed performance are achieved via one of two proposed valve modifications; both modifications essentially calibrate the individual valves such that said valves are activated in sequential order, being predefined and dependent upon the activating voltage.

A first valve modification is accomplished through mechanical means. Adjustment and alteration of the respective spring force, or resistance, of each proportional valve armature can be maintained such that each valve opens at different voltages based upon the preset calibration of the valve. According to a second valve modification, the adjustment of the respective, electromagnetic activation coil is sequenced such that each proportional valve opens at different voltages based upon magnetic sensitivity defined by the commanding input voltage.

In either example it is shown and taught that by using a plurality of proportional valves activating sequentially, the cumulative effect of said valves actuation offers high-speed and high-precision flow output characteristics at both low and high flow.

FIG. 1 shows a mechanical construction which incorporates an input voltage source (not shown) to a proportional valve assembly 22. Proportional valve assembly 22 operates in response to an incoming pneumatic pressure at pressure inlet port, as well as to an input voltage from electrical line 42, to activate valve apparatus housing a plurality of sequentially operated proportional valves 12a and 12b. Proportional valves 12a and 12b are operationally attached to valve manifold 26. Proportional valves 12a and 12b are of the two-way variety and include a flexible armature 25 manipulated by a magnetic core 27. An input voltage cable 42 is in electrical communication with proportional valves 12a and 12b.

Proportional valves 12a and 12b are in parallel fluid communication with pneumatic pressure at pressure inlet port 30 and flow output port 31.

2. Operating of the Preferred Embodiment(s)

An increase in the input voltage corresponds to a desired increase in proportional flow output and causes an instantaneous increase of the power supply current supplied to the proportional valves via electrical line.

Two improvements over the existing electropneumatic values are incorporated with the present invention in order to establish an improved valve actuation response time and an improved turn down ratio in relation to the electromagnetic response of the device for a given input voltage. The first improvement to the electropneumatic control valve is the mechanical modification of the valve spring force. The armatures 25 of proportional valves 12a and 12b modified to have increased resistance. In turn, the increased resistance modifies the calibration value at which the proportional valves 12a and 12b are set to open.

The second modification involves the adjustment of each respective electromagnetic activation coil of proportional valves 12a and 12b. By adjusting the electromagnetic sensitivity, as defined by the commanding input voltage, the proportional valve 12 is capable of achieving an improved valve actuation response time, as well as an improved turn down ratio in regards to the electromagnetic response for a given supply voltage.

The foregoing descriptions of specific embodiments of the present invention are presented for purposes of illustration and description only. They are not intended to be exhaustive or to limit the invention to the precise forms disclosed and, obviously, many modifications and variations are possible in light of the above teaching. The embodiments are chosen and described in order to best explain the principles of the invention and its practical application, to thereby enable others skilled in the art to best utilize the invention and the embodiments with various modifications as are suited to the particular use contemplated. It is intended that a scope of the invention be defined by the Claims appended hereto and to their equivalents. Therefore, the scope of the invention is to be limited only by the following claims.

What is claimed is:

1. An electro pneumatic proportional pneumatic flow control valve assembly comprising:
   a valve manifold portion that includes an inlet port and an outlet port, wherein the inlet port is configured to receive a pneumatic fluid flow, and wherein the outlet port is configured to provide an outlet flow rate;
   a first valve having an open and a closed state, wherein the inlet port is in flow communication with the first valve via a first inlet path, wherein the outlet port is in flow communication with the first valve via a first outlet path,
   a second valve having an open and a closed state, wherein the inlet port is in flow communication with the second valve via a second inlet path, wherein the outlet port is in flow communication with the second valve via a second outlet path, and wherein the first and second valves operate in parallel with each other; and
   an electronic controller that provides a single input voltage in operational communication with the first and second valves, wherein the first valve is configured to switch from the closed state to the open state at a first input voltage value, wherein the second valve is configured to switch from the closed state to the open state at a second input voltage value, and wherein the second input voltage value is higher than the second input voltage value.

2. The valve of claim 1, wherein the outlet flow rate is higher when the input voltage is at the second input voltage value and both the first and second valves are in the open state than when the input voltage is at the first input voltage value and only the first valve is in the open state.

3. The valve of claim 2, wherein the first valve includes a first valve armature that includes a first spring force, wherein the second valve includes a second valve armature that includes a second spring force, wherein the second spring force is greater than the first spring force.

4. The valve of claim 3, wherein a first fluid path is defined from the inlet port through the first inlet path, past the first valve armature, through the first outlet path and to the outlet port, and wherein a second fluid path is defined from the inlet port, simultaneously through the first and second inlet paths, simultaneously past the first and second valve armatures, simultaneously through the first and second outlet paths and to the outlet port.

5. The valve assembly of claim 3, wherein the first valve includes a first upper housing portion and a first lower housing portion, wherein the first upper housing portion is threadedly connected to the first lower housing portion, wherein the first lower housing portion is threadedly connected to the valve manifold portion, wherein the second valve includes a second upper housing portion and a second lower housing portion, wherein the second upper housing portion is threadedly connected to the second lower housing portion, and wherein the second lower housing portion is threadedly connected to the valve manifold portion.

* * * * *